United States Patent [19]
Huskey

[11] 3,762,250
[45] Oct. 2, 1973

[54] METHOD OF AND APPARATUS FOR HANDLING MATERIAL

[75] Inventor: C. George Huskey, Circleville, Ohio

[73] Assignee: E. I. du Pont de Nemours and Company, Wilmington, Del.

[22] Filed: June 16, 1971

[21] Appl. No.: 153,512

[52] U.S. Cl............... 83/27, 83/39, 83/107, 83/365, 83/368, 83/425.1, 83/425.2, 83/428, 83/513, 83/923
[51] Int. Cl............................................. B26d 5/02
[58] Field of Search.................. 83/428, 425, 923, 83/27, 56, 107, 39, 365.1, 368, 371, 425.1, 425.2, 513

[56] References Cited
UNITED STATES PATENTS

| | | | |
|---|---|---|---|
| 3,156,149 | 11/1964 | Frizelle | 83/371 X |
| 3,670,615 | 6/1972 | Scholl | 83/923 X |
| 2,871,940 | 2/1959 | Meunier | 83/371 X |
| 3,453,916 | 7/1969 | Green | 83/428 X |
| 3,272,049 | 9/1966 | Cooksey | 83/371 |
| 3,552,252 | 1/1971 | Maxey et al. | 83/371 X |

Primary Examiner—Andrew R. Juhasz
Assistant Examiner—Horace M. Culver
Attorney—Hoge T. Sutherland

[57] ABSTRACT

A material handling method including the steps of moving the material in a first path by first moving means; slitting the material as it moves in the first path to form beads and a web; moving the web in a second path by second moving means while moving the beads in the first path; expanding the beads and severing the web to form the material again; and, moving such material in the first path by the first moving means.

Apparatus is provided for performing the above described method.

9 Claims, 8 Drawing Figures

INVENTOR
C. GEORGE HUSKEY

BY Hoge O. Sutherland
ATTORNEY

INVENTOR
C. GEORGE HUSKEY

INVENTOR
C. GEORGE HUSKEY

BY *Hoge T. Sutherland*

ATTORNEY

METHOD OF AND APPARATUS FOR HANDLING MATERIAL

BACKGROUND OF THE INVENTION

1. Field of the Invention

This invention is a material handling apparatus and method and, more particularly, is directed to a novel method of and apparatus for moving or advancing the material in a first path and for bringing a web formed from such material back to the first path from a second path by means of beads formed from the material, all in a high speed, continuous operation. The beads, which move only in the first path, provide the necessary control over the movement of the rest of the material.

In the U.S. Patent Office, "Manual of Classification," apparatus for and methods of handling or advancing material of indeterminate lengths of the type of the instant invention are classified in Class 226.

2. Description of the Prior Art

Material handling devices are old. It is known, for example, to thread a continuously moving web in a predetermined path by various mechanical or pneumatic means.

An early teaching is U.S. Pat. No. 1,326,615 to Pope which shows advancing a web of paper between processing stations with the aid of a series of air nozzles or jets placed strategically along a vertical stack of calender rolls. A narrow lead strip is cut manually from the marginal edge of the web and caused to be carried from a drier unit to the top of a calender roll stack by an endless driven guiding belt and a plurality of air nozzles and doctors. Such lead strip is formed by pressing a knife into the margin of the web after which an air nozzle adjacent the belt is turned on causing the leader strip to be blown by the blast of air outwardly from the exit of the drier into contact with the belt. A doctor then detaches the lead strip with the assistance of an air blast from a second nozzle and diverts it into the bite of the top set of calender rolls. From there, it is directed into the lower rolls by other doctor and air nozzle combinations positioned at the exit ends of the rolls. After it is running satisfactorily through the calender stack, the knife is moved manually to the opposite end thereby increasing the lead strip to full web width.

Another teaching is U.S. Pat. No. 1,338,094 to Pope wherein an air nozzle conveying system is combined with a guide plate or deflector for directing currents of air along a desired path of travel for automatically transferring a lead strip of a web from one device to another.

Still another teaching is found in copending U.S. Patent application Ser. No. 84,984, filed Oct. 29, 1970, wherein is shown and described an apparatus for winding a web onto a windup roll including first moving means for moving the web along a first path; means for forming a leader strip in the web as it moves in the first path; means for cutting the leader strip and diverting it into a pneumatic second moving means including at least one tube having a slot therein for moving the strip in a second path; third moving means for pulling the strip from the slot in second moving means and into a third path and moving in such third path; means for expanding the strip into a full width web whereafter the third moving means moves the full width web along the third path and into operative association with a web windup means; means for cutting the full width web and threading it onto a windup roll of the web windup means; and means for winding the full width web onto the windup roll.

These methods and devices do not provide for the controlled handling of a web that moves in a second, different, path from beads which move in a first path and both of which are formed from the same material, together with the novel return of the web to that first path as the material moves at high speeds, as in the instant invention.

SUMMARY OF THE INVENTION

This invention relates to material handling and, more particularly, to a method of and apparatus for automatically positioning or repositioning a light-weight, wide width polymeric film in predetermined paths as the film moves at high speeds.

In the manufacture of elongated webs of polymeric film, the material must undergo numerous processing steps, such as heating, drying, washing, stretching, bead trimming, surface treatment, etc., before the finished web arrives at the packaging station. This usually requires moving of the material through a complicated, tortuous process or work path for some of the operations must be performed in progressive stages and at variable speeds. For example, in the production of thin polymeric film a narrow relatively thick ribbon is initially cast in a thermoplastic state onto a quenching surface and rapidly cooled into a hardened condition; the material is then reheated to a temperature above the glass transition temperature and stretched, usually bidirectionally into a light-weight film many times longer, wider and thinner than the initial ribbon. The speed of the thin film beyond the stretching station is, of course, substantially higher due to the corresponding elongation. Likewise, the tension forces on the film before and after stretch elongation are considerably changed. Thus, to accommodate for these variations, the material must be conveyed or moved in a predetermined process path from one work station to the next over a variety of process or transfer rolls, some of which are power driven, to provide the required tensioning and advancing forces.

A typical device or means for stretching the film is shown in U.S. Pat. No. 2,823,421 to Scarlett. As seen there, such film is continuously stretched longitudinally and then transversely in a device essentially composed of two main parts, namely, a longitudinal stretching section and a transverse stretching section. The longitudinal stretching section is composed of horizontal rolls in parallel arrangement in line in different vertical and horizontal planes. The first rolls are positively driven "slow rolls" and later rolls are closely spaced idler rolls not positively driven and still later rolls are positively driven "fast" rolls. Actual stretching is carried out over the span including the idler rolls.

The transverse section of the stretching device is essentially divided into four zones, and the entire section is composed of a tenter frame having a chain of tenter clips on both sides of the film. As the film emerges from the longitudinal stretching section, it is directed between parallel rows of tenter clips and these tenter clips grasp the edges of the longitudinally stretched material and move outwardly to stretch the film transversely. The thickened edges of the film formed during the manufacturing operation inherently provide an excellent gripping means for the tenter clips. The thickened edges or beads later have no use as film and are cut from the material and sent to a recovery area. It is in the stretching area that many material handling problems occur; it is not uncommon, for example, for breaks or defects to develop in the film as it is being stretched while it moves at high process speeds.

It is important, when such a break does occur, to make certain that the film does not continue in the process path and, hence, onto the windup roll or cause the severing of the beads to interrupt the continuity of their movement to the waste recovery area. Desirably, the defective portion of the film or other material being processed should go to a waste recovery area; preferably to the same area to which the beads are being sent.

When a defect does occur during the transverse stretching operation, usually it has required slowdown or stoppage of the entire operation when following the practices of the prior art. The procedures are inefficient, requiring a number of skilled operators, are rather hazardous and, of course, costly due to lost production from downtime. At modern high productivity rates, means must be provided for immediate transfer of the defective material to a remote location, otherwise great quantities of film accumulate in the operating area, further adding to the hazards.

The present invention solves this problem and other problems existent in the prior art by providing means and methods for automatically diverting the defective material to a recovery path and moving it in the predetermined recovery path until the material defect problem is cured at which time it is returned to the normal process path.

The invention further provides means and methods for detecting a break in the material as it emerges from the tenter frame (or, if desired, anywhere in the process path) which initiates the severing of the web formed from the material to divert it from the process path and the expanding of the beads into the full width material which is carried by the beads into the waste recovery area along the recovery path in which the beads are already moving. By doing this, little or none of the defective material is moved into the process path, but instead into the recovery path, until the break is corrected, at which time the web is again positioned in the process path for normal operation.

DESCRIPTION OF THE PREFERRED EMBODIMENT

This invention is a material handling apparatus and method.

Briefly described, such apparatus includes:
means for moving material from a supply source along a first path to a first work station by first moving means;
means for forming beads and a web in the material as it moves;
means for moving the web in a second path to a second work station by second moving means;
means for expanding the beads and severing the web to form the full width material again; and
means for moving the full width material in the first path to the first work station.

Figure 1:
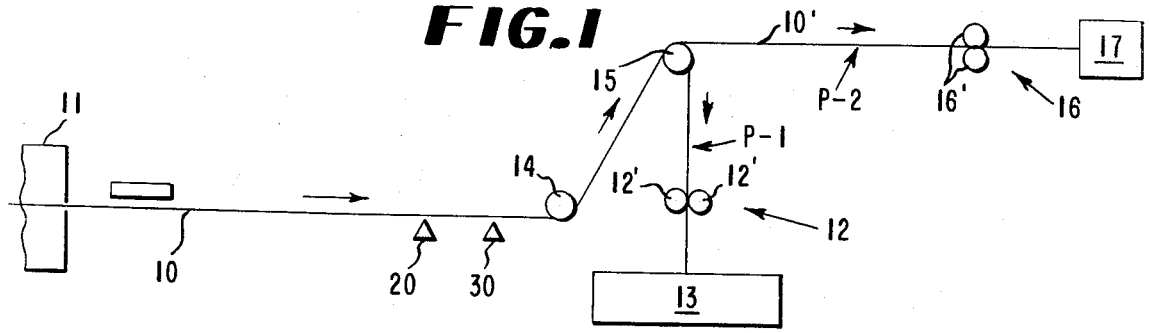
FIG. 1 is a schematic view of a material handling apparatus of this invention including material slitting means for forming, as the material moves in a first path, beads and a web, or webs; means for moving the beads and web in such first path; means for moving the web in a second path; and bead expanding and web severing means for expanding the beads and severing the web to establish the full width material again, which material is moved in the first path to complete the operational cycle of the apparatus.

Referring to the drawing and FIG. 1 in particular, a web of material 10, such as plastic film, to be handled by the apparatus of this invention is supplied from a supply source 11, and moved along a first path P-1 by appropriate mechanical first moving means 12, such as nip rolls 12', and to a first work station or means 13, such as a waste shredder or scrap recovery area. The supply source 11 may be any appropriate source, for example, it may be a web of plastic film as it emerges from the tenter frame of a polyethylene terephthalate film production line.

In the embodiment shown, from the supply source 11, at start-up, the material 10 first passes around guide rolls 14 and 15 and into the bite of the driven nip rolls 12'. The material 10 is moved or advanced from tenter frame along the first path P-1 by these nip rolls 12' and, hence, to the waste shredder 13 which may feature a high speed rotary blade similar to the kind described in U.S. Pat. No. 3,545,686, issued Dec. 8, 1971.

The apparatus of the present invention provides means for and method of slitting the material 10 to form a web 10' and beads 10b, by slitting the thickened edges 10e from the material 10, and moving such web 10' along a second path P-2 by second moving means 16, such as nip rolls 16', into operative relationship with a second work station or means 17, such as a web windup roll or means and further provides a novel means for and method of widening the beads and severing the web to form the full width material again and to move such material in the first path P-1 to the shredder 13.

The prime object of this invention is to provide for improved positioning of a material which is safe and reliable, and to provide for improved material handling means which is simple, efficient and capable of controlling material as it moves in complicated process path configurations at high velocity.

The web handling apparatus of this invention generally comprises:

the first moving means 12 for moving the material 10 from a supply source along the first path P-1 to the first work station 13;

means 20 for forming the beads 10b and the web 10' in the material 10 as it moves;

the second moving means 16 for moving the web 10' in the second path P-2 to the second work station 17 with the beads 10b moving in the first path P-1 to the first work station 13;

means 30 for expanding the beads 10b and severing the web 10' as they move to form the material 10 in full width again; and the first moving means 12 for moving the formed material 10 in the first path P-1 and to the first work station 13 to complete the operational cycle.

The web slitting means 20 essentially comprises two outer slitting knives 21 appropriately mounted for operative, predetermined, selective engagement with the material 10 to slit it to form the web 10' and the beads 10b. It is often the practice also to slit the web 10' to form two or more narrow width webs 10'' and 10''' for winding on separate rolls. For this purpose, an interior slitting knife 22 (shown in phantom) may be used to slit the web to form such webs 10'' and 10''' which are directed along the appropriate second path P-2 to separate windup stations, not shown. Slitting knives 21 and 22 are maintained in slitting engagement with the material and web by a control device 23, which is adapted to retract the knives from slitting engagement, as will further be explained.

The bead expanding and web severing means 30 essentially consists of two outer knives 31 (shown, as are the other knives 21 and 22, diagrammatically) which, like the knives 21 and 22 are appropriately mounted for selective engagement with the material controlled by the control device or pneumatic actuator 23.

Sensing apparatus is provided so that when the material 10 approaching the slitting area is free of defects, breaks or discontinuities, a light source 40 directs an incident light beam 41 toward the material surface which beam is reflected from the continuous, non-defective surface of material 10 along a reflected beam path 42 to a receiver 43. A signal from the receiver 43, indicating the presence of the reflected beam, is transmitted along a conductor 44 to the control device 23. Such control device 23 contains appropriate amplifiers and transducers, as are known to the art, to actuate valves in response to the signal, to control the flow of air to a pneumatic cylinder 45, causing the slitting knives 21 (and 22, if desired) to engage the material 10 or retract as required. In the absence of a discontinuity, with the material 10 in regular running condition, with a reflected light beam present, the knives engage and slit the beads from the web.

Figure 5:
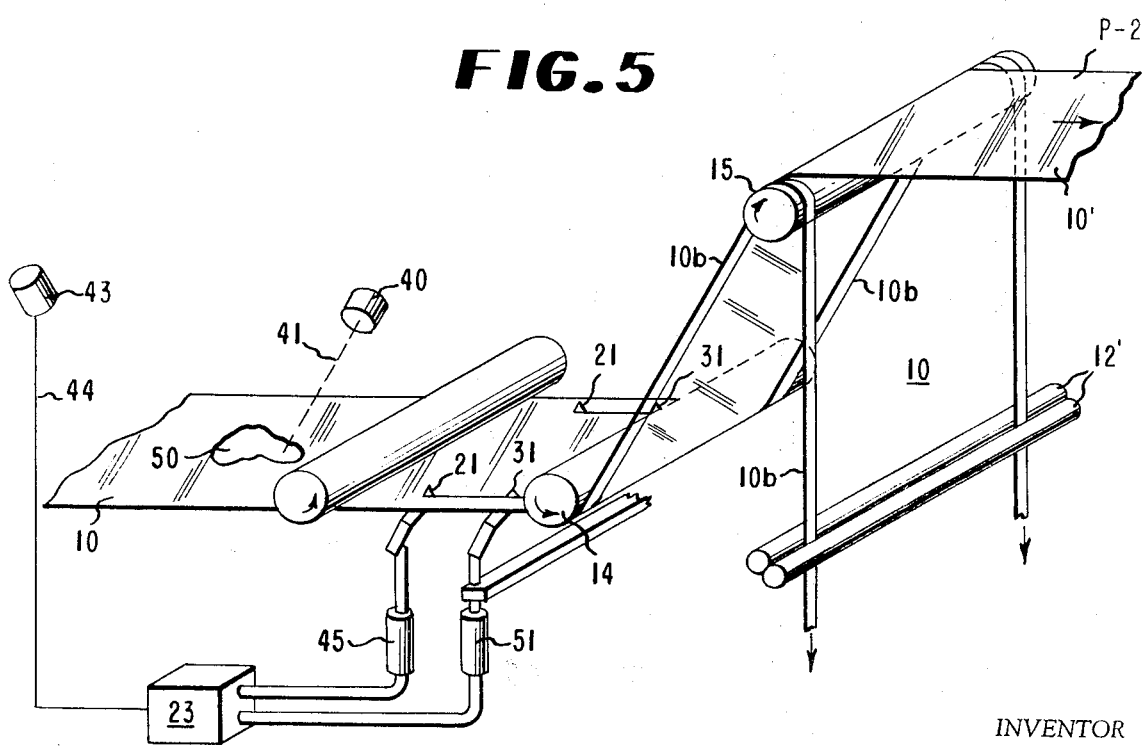
FIG. 5 shows a third stage of operation after a break in the material has been detected and the web severing means have engaged the beads or moved into operative association with the material.

Upon occurrence of a discontinuity, however, as illustrated in FIG. 5 (in which the apparatus is identical to FIG. 3, but, some parts of which have been positioned somewhat differently, for clarity), a tear or discontinuity 50 passes into the path of the indicent beam 41, so that no reflection occurs. The interruption of the reflected beam 41 and its signal causes the control device 23 to activate valves to operate a pneumatic cylinder 51, engaging the traversing slitting knives 31 with the material 10. These knives 31 are provided with traversing means, in the form of electric or pneumatic motors (not shown) to cause the knives 31, upon a completion of the upward stroke engaging the material 10, immediately to begin traversing toward each other and toward the center of the material 10 until they widen or expand the slit beads 10b and join them in the central part of the material 10 to sever the web 10'.

It is required that the traversing knives 31 come into engagement with the material 10 just outside the edges of the web 10' or, preferably, between the inner and outer edges of the beads 10b prior to moving inwardly to sever the web 10'.

It is further important, that as soon as the traversing knives 31 come into engagement with the material, that the slitting knives 21 (and 22) retract, so as to establish continuity between the beads 10b and ever widening portions formed in the web 10' by the traversing knives 31 as they move inwardly.

The material slitting knives 21 preferably are conventional industrial type razor blades, each of which is mounted rigidly in a carriage and adapted by the pneumatic actuator 23 for upward movement into contact with the moving web 10 as it moves in the first path P-1 between the tenter frame 11 and the roll 14. During normal operation, the knife blades 21 are adjacent the edges of the material 10 and actuated upwardly for slitting or forming the web 10' and the beads 10b in the material 10.

Figure 4:
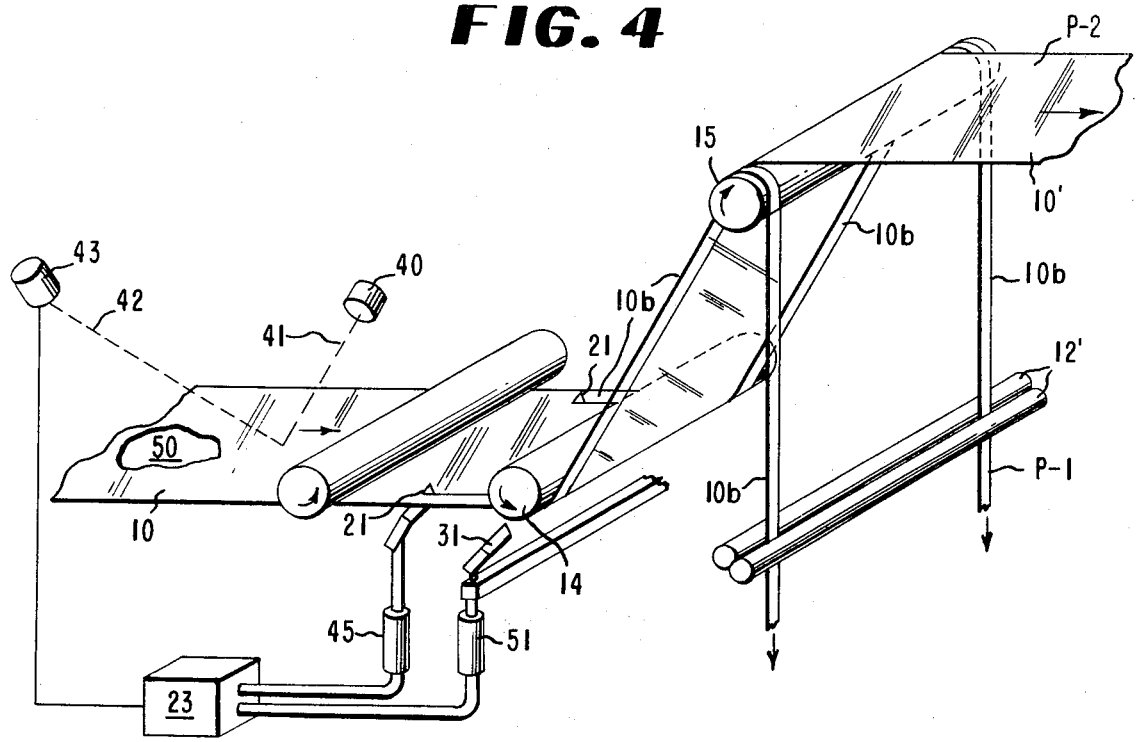
FIG. 4 shows a second stage of operation with the web at this stage moving in a second path toward a second work station while the beads move in the first path toward a first work station, such as a waste material shredder.

After the beads 10b are formed, they, together with the rest of the material 10 (i.e., the web 10'), continue for a period of time along the first path P-1, through the nip rolls 12' and into the shredder 13 prior to the engaging the web 10' by the second moving means 16 to move it in the second path P-2 at which time normal operation is in effect as shown in FIG. 4.

An appropriate means and method for moving the web 10' into operative association with the second moving means 16 is shown and described in copending application Ser. No. 84,984, filed Oct. 29, 1970.

The web 10' is moved in the second path P-2 by and through the second moving means 16, prior to being pulled back into the first path P-1 where it is adapted to be converted to the full width material. In this path P-1, the web 10' will be in position to be re-threaded into the second path P-2 again when normal operations resume and the material break or defect is corrected. It is this critical path P-1 that this invention automatically seeks and finds, when the material 10 is less than perfect, in a novel manner of great usefulness in the web handling arts.

The fully automatic apparatus of this invention is capable of handling webs of polyester or polyolefin film of varying thicknesses and widths as these webs move at high speeds in tortuous, complex process paths. The apparatus may integrate with the web windup means such as a commercial indexing turret type unit similar to Model 30–322 manufactured by the Black Clawson Company, Fulton, N.Y. Windup is adapted with standard auxiliary mechanisms for automatic transfer of the web 10' from a full to an empty core. The positioning of the web 10' in operative relationship to a windup device (i.e., in path P-2) is an important goal of this invention.

One purpose of the present invention is to prevent engagement of a discontinuity 50 with the slitting knives 21 (or 22) which may cause entanglement and breakage of the beads 10b, which then may become wound onto a windup roll, thereby damaging the film roll. (It should be observed that the main portion of the film material is preferably biaxially oriented and, thus, has very high strength, while the edges 10e, which have been engaged in tenter clips and are not drawn biaxially, are brittle, and tend to fibrillate. This permits easy breakage of the bead 10b and disruption of its path P-1 to the shredder 13 so that it is carried along path P-2 to the windup.) The time required for retraction of the slitting knives 21 plus the traverse and retraction of the severing knives 31 must be sufficiently low that these functions are completed before the discontinuity 50 can pass from the point of detection sufficiently to become entangled with the knives 21 or 31. Such entanglement can cause severing of the beads or wrapping of the film onto transfer rolls, either of which causes significant downtime of the entire production process.

Further, with regard to the traversing knives 31, it is preferable that they move toward each other along parallel, but not coinciding lines so that when they reach the center they pass each other or approach each other close enough to complete the severing of the web 10'. At this point, they are immediately retracted to allow the full width material 10, with its defect, to pass without interruption, to the scrap recovery area along the first path P-1.

Figure 6:
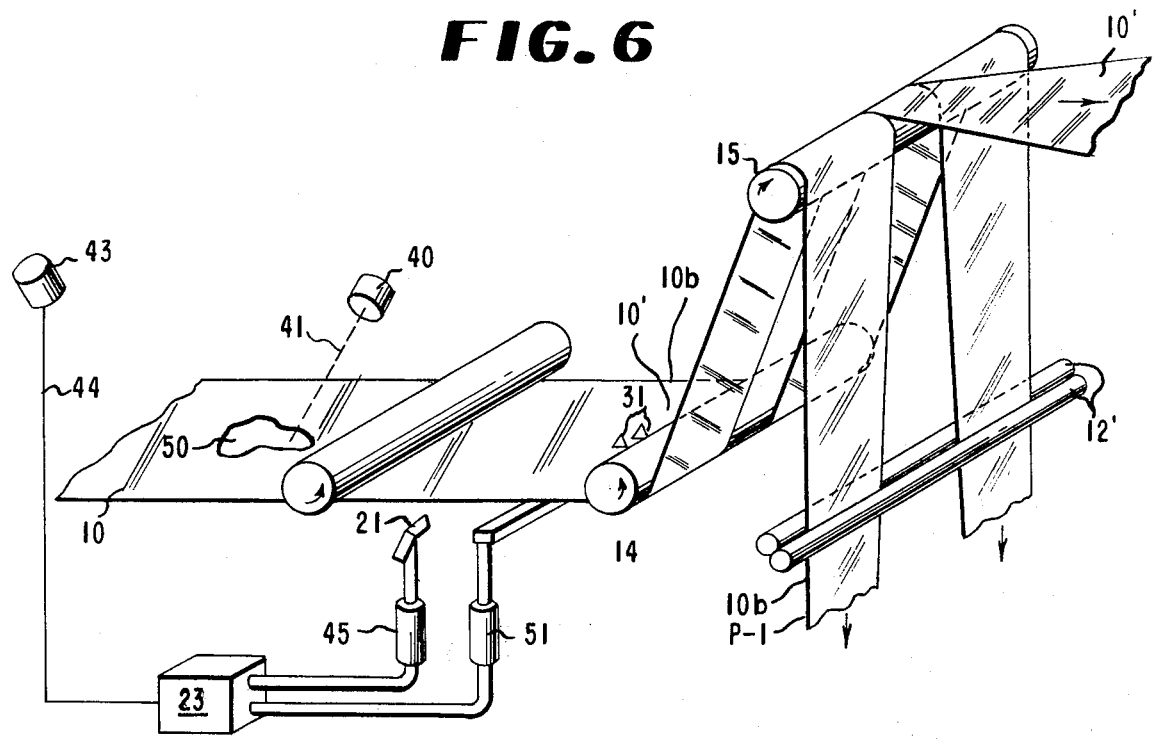
FIG. 6 is a fourth stage of operation showing retracting of the material slitting means. At this stage, the web severing means have traversed to a point where the web is almost completely severed and the beads have been expanded substantially to full material width.
Figure 7:
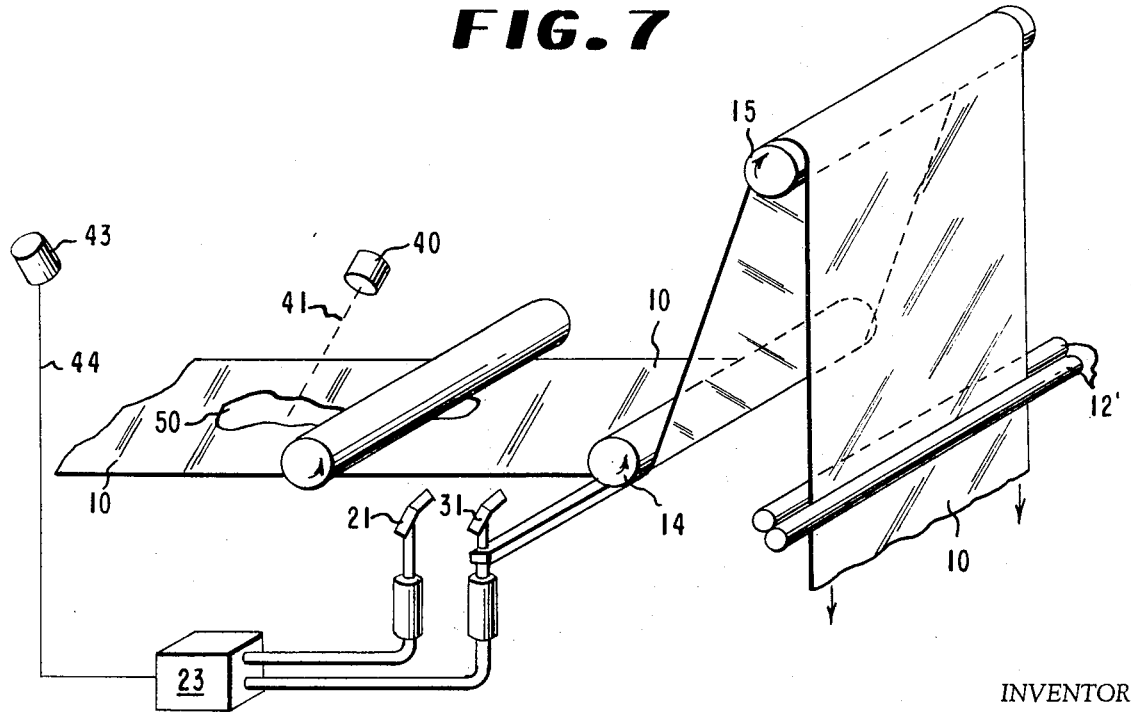
FIG. 7 shows a fifth stage of operation after the web severing and bead expanding means have formed the full width material again, which material moves in the first path to complete the operational cycle.
Figure 8:
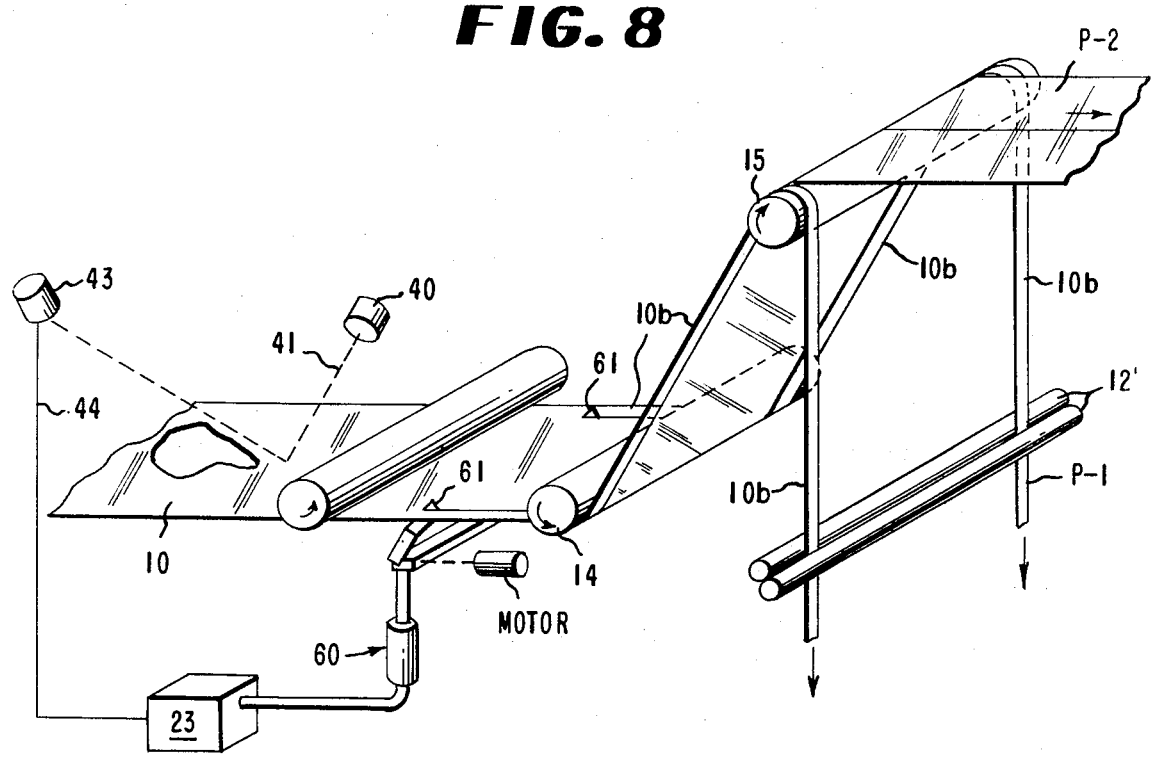
FIG. 8 shows parts of an alternative material handling apparatus of this invention in which the material slitter means also performs the web severing and bead expanding function.

FIG. 8 shows an alternate embodiment of the apparatus of this invention in which both (1) the material slitting function and (2) the bead expanding and web severing functions are performed by a single means 60 which consists of knives 61 which slit the material 10 to form the beads 10b and the web 10' and which knives 61 further are operable to move or traverse inwardly to widen the beads 10b and sever the web 10' in a manner similar to that described regarding the bead expanding and web severing means 30 of the apparatus shown in FIGS. 1–7.

OPERATION

Prior to starting up the apparatus of this invention for positioning the web 10' in operative relationship with a second work station 17 (usually a roll winding device for winding the web 10' onto a core), certain process conditions must be preset and activated before the automatic sequence can be initiated.

As best shown in FIG. 1, the wide width material 10 is first moved along the first path P-1 by the driven nip rolls 12' from the supply source 11 and into the waste shredder 13 which has been previously activated by an operator.

Figure 3:
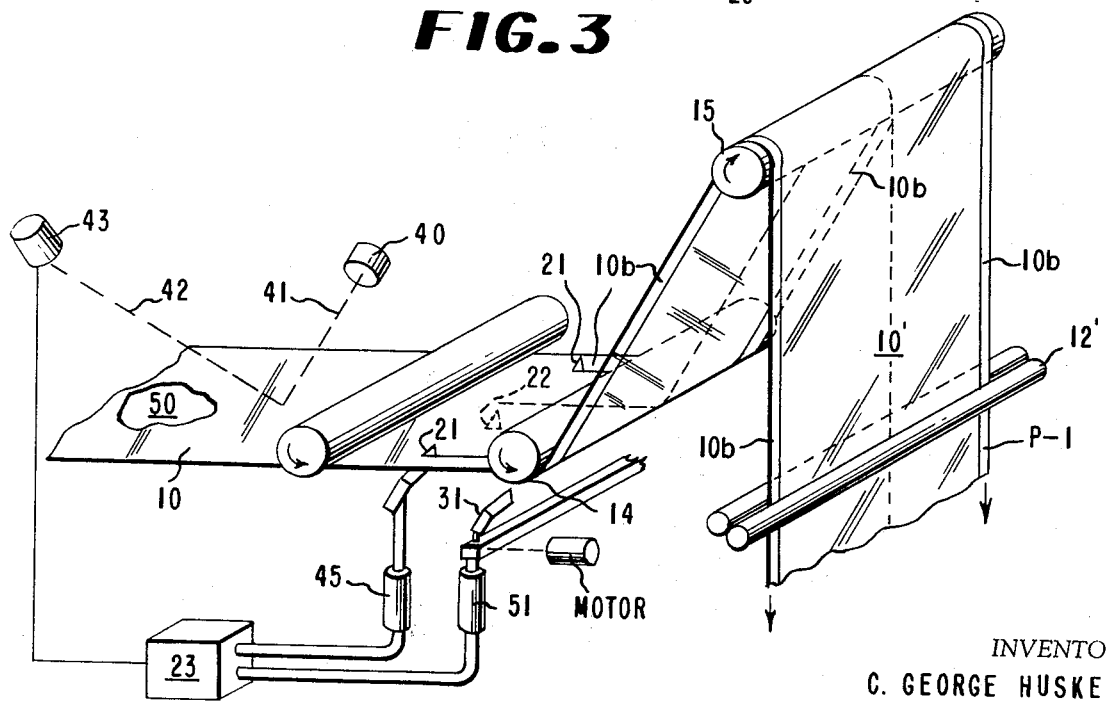
FIG. 3 is a schematic representation of the initial start-up of the material handling operation beginning with the formation of the beads and the web from and by slitting the full width material by material slitting means as it moves in the first path.

The operator then, by appropriate means and corrections, not shown, activates the control device 23 and cylinder 45 to move the knives 21 upwardly into the moving material 10 to slit it and form the web 10' and the beads 10b, as shown in FIG. 3. These beads 10b together with the main body of the material 10 (i.e., the web 10') all continue to be moved along the first path P-1 and into the waste shredder by the first moving means 12. This completes the first step or stage of operation of the apparatus of this invention.

In the second stage or step of operation of the apparatus, as shown in FIG. 4, the web 10' is moved out of the first path P-1 and into the second path P-2 and such web 10' is moved along this second path P-2 by the second moving means 16, as shown in FIG. 1. In this step, the material slitting knives 21 continue to slit the material 10 to form the beads 10b and the web 10' as they did in the first step of operation except that in this step the web 10' moves along the second path P-2 while the beads 10b continue along the first path P-1 and into the shredder. This continuity of the beads 10b to the shredder along the first path P-1 is critical to this invention for it provides a control over the material 10 and the web 10' cut from such material 10 as the material 10 and as the web 10' move at high speeds, as has been explained and as will further be explained. FIG. 4 shows the normal, desired operation of the apparatus of this invention with the web 10' moving in the process or second path P-2 and the beads moving in the recovery or first path P-1.

Figure 2:
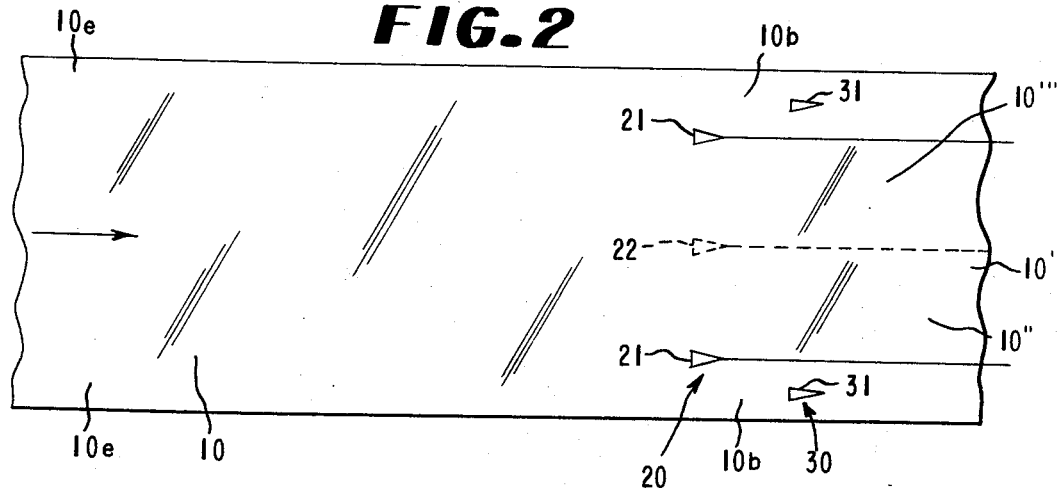
FIG. 2 is a plan view showing the positions of the material slitting means and the web severing means with respect to each other and the material before, and after, the web and beads are slit therefrom.

Such normal operation of the apparatus is interrupted if a web defect 50 is detected in the material 10 by the web defect sensing means which sends the appropriate signal to the control means or device 23. As shown in FIG. 5, the detection of this defect in the material as it moves and before it reaches the material slitting means initiates third step or stage of operation. As seen in this figure, the control device 23 signals the cylinder 51 to move the bead expanding and web severing knives 31 into operative relationship with the material 10. Preferably, this means that the knives 31 move upwardly into the beads 10b between the inner and outer edges of such beads 10b, as best seen in FIG. 2, from which location they immediately start to traverse inwardly to widen the beads 10b and to sever the web 10' as shown in FIG. 6. This inward movement to widen or expand the beads 10b and to sever the web 10' constitutes the fourth step of operation. It is noted that the beads 10b and part of the web 10' connected to each bead 10b are moved with the beads 10b along the first path P-1 as and after the web 10' is severed. In essence, this means that the web 10' is disconnected from the second path P-2 and moved with the beads 10b in the first path P-1 prior to the defect 50 reaching the second path P-2 and, therefore, assuring that such defect 50 is not wound onto a roll to render it defective. Again, it is this continuity to the shredder of the beads 10b which pull the web 10' with it which is the touchstone of this invention.

FIG. 7 shows the fifth and last stage which completes the operation. As is seen here, both the material slitting means 20 and bead expanding, web severing means 30 are retracted from operative contact with the material so that the material 10 in its full width moves along the first path P-1 to the shredder. At this point, the operation is complete and the slitting knives 21 may again be moved back into operative relationship with the material 10 to slit the beads 10b therefrom and form the web 10' as shown in FIG. 3.

METHOD

Briefly, the preferred method of this invention includes the steps of:

moving the material along a first path by first moving means;

slitting the material as it moves by material slitting means to form beads adjacent the outer edges thereof and a web;

moving the beads and the web in the first path by the first moving means and into a shredder;

engaging the web by second moving means;

moving the web along a second path by the second moving means;

detecting a defect in the material by material defect detecting means as it moves and before it reaches the material slitting means;

moving the bead expanding web severing means into operative association with the material;

moving the material slitting means out of operative association with the material;

moving the beading expanding web severing means inwardly of the outer edges of the material to sever the web as it moves in a second path thereby to disconnect the web from the second moving means;

moving the beads and the part of the web connected to each bead in the first path as and after the web is severed;

moving the bead expanding and web severing means out of operative relationship with the material; and moving the material along the first path by the first moving means.

It is to be understood that this invention is operative for controlling the handling of the material 10 and the diverting of the web 10' to the first path P-1, from the second path P-2, at any time it is desired. For example, although it is shown as being operative to automatically divert the web 10', and, then, the material 10, from a process path to the shredder along a recovery path if a discontinuity or break occurs in the tenter frame and before the material 10 reaches the material slitting area, the methods and means of such invention are operative to provide the same controls if a break occurs in the web 10' after the slitting area, say, in the windup area. Another detection means may be located in any position after the slitting area to control the apparatus or, in the alternative, manual operational control may be utilized. It is further deemed important to note the means and methods and means of this invention are operable if there are no breaks at all in the material or web, depending only on the operator's desire to render the apparatus operational and to set the steps in motion.

This novel method and apparatus as described hereinabove are hereinbefore has utility and provides an unobvious means and way of handling material.

What is claimed is:

1. A material handling method including, in sequence, the steps of:

moving a material having a thickened bead along each of its lateral edges along a first path by first moving means;

slitting said material as it is moved along said first path to separate said beads from said material and to form a web;

moving the web in a second path by second moving means;

increasing the amount of web left attached to the beads and severing the web to reform the material; and, moving the material along the first path by the first moving means.

2. A material handling method including, in sequence, the steps of:

moving a material having a thickened bead along each of its lateral edges along a first path by first moving means;

slitting the material as it moves by material slitting means to separate the beads therefrom and thereby form a web;

moving the beads and the web in the first path by the first moving means;

engaging the web by second moving means;

moving the web along a second path by the second moving means;

moving web severing means into operative association with the material;

moving the material slitting means out of operative association with the material;

moving the web severing means inwardly of the outer edges of the material to sever the web as it moves in the second path thereby to disconnect the web from the second moving means;

moving the beads and the part of the web connected to each bead in the first path by the first moving means as and after the web is severed;

moving the web severing means out of operative relationship with the material; and moving the material along the first path by the first moving means.

3. The material handling method of claim 2 wherein the web severing means operatively engages each bead between its inner and outer edges prior to moving inwardly to sever the web.

4. The method of claim 2 including the step of detecting a defect in the material by material defect detecting means as it moves and before it reaches the web severing means.

5. The method of claim 4 wherein the web severing means are moved inwardly prior to the material defect reaching such web severing means.

6. The method of claim 4 wherein the web severing means completely severs the web prior to the material defect reaching such web severing means.

7. In a method of handling a material having a thickened bead along each of its lateral edges, which beads are slit from the material to form a web and are moved in a first path to a scrap recovery area while the web is moved in a second path to a second work area, wherein the web is diverted from the second path upon occurrence of a discontinuity in the material before it arrives at a location for slitting the beads from the material to form such web, the steps comprising:

engaging the material with material slitting and severing knives and slitting the beads from the edges of the material to form the web;

moving the beads in the first path to a scrap recovery;

moving the web in the second path to the second work station;

sensing a discontinuity in the material as it approaches the material slitting location and providing a signal indicative of the presence of such discontinuity;

the signal actuating a control to cause the material slitting and severing knives to traverse inwardly from each edge of the material toward the center, widening the beads and thereby diverting a progressively larger portion of the material to the scrap recovery area; and as the material slitting and severing knives reach a location substantially in the center of the material, retracting the knives from engagement with the material and moving the full, unslit material to the scrap recovery.

8. A material handling method including, in sequence, the steps of:
moving the material having a thickened bead along each of its lateral edges along a first path by first moving means;
slitting the material as it moves by material slitting and web severing means to separate the beads therefrom and thereby form a web;
moving the beads and the web in the first path by the first moving means and into a shredder;
engaging the web by second moving means;
moving the web along a second path by the second moving means;
detecting a defect in the web by web defect detecting means as it moves in the second path and before it reaches the material slitting and web severing means;
moving the material slitting and web severing means inwardly of the outer edges of the material to sever the web as it moves in a second path thereby to disconnect the web from the second moving means;
moving the beads and the part of the web connected to each bead in the first path as and after the web is severed by the first moving means;
moving the material slitting and web severing means out of operative relationship with the material; and
moving the material along the first path by the first moving means.

9. Apparatus for handling material including:
first moving means for moving material having a thickened bead along each of its lateral edges from a supply source along a first path to a first work station;
means for separating the beads from the material thereby to form a web in the material as it moves;
second moving means for moving the web in a second path to a second work station with the beads moving in the first path to the first work station;
means for increasing the amount of web left attached to the beads and means for severing the web as it moves thereby to form the material again; and
the first moving means moving the formed material along the first path and to the first work station again.

* * * * *